(12) United States Patent
Reese et al.

(10) Patent No.: US 9,162,374 B2
(45) Date of Patent: Oct. 20, 2015

(54) PLANT AND METHOD FOR THE RECYCLING OF PLASTICS, PREFERABLY PET

(75) Inventors: Lars Reese, Flensburg (DE); Arne Haase, Harrislee (DE); Norbert Peters, Flensburg (DE)

(73) Assignee: KRONES AG, Neutraubling (DE)

( * ) Notice: Subject to any disclaimer, the term of this patent is extended or adjusted under 35 U.S.C. 154(b) by 164 days.

(21) Appl. No.: 13/419,611

(22) Filed: Mar. 14, 2012

(65) Prior Publication Data
US 2012/0238650 A1    Sep. 20, 2012

(30) Foreign Application Priority Data
Mar. 15, 2011 (DE) .......................... 10 2011 005 568

(51) Int. Cl.
| | | |
|---|---|---|
| *B29B 17/00* | (2006.01) | |
| *B29B 9/08* | (2006.01) | |
| *B29B 7/26* | (2006.01) | |
| *B29C 45/17* | (2006.01) | |
| *B29K 67/00* | (2006.01) | |

(52) U.S. Cl.
CPC . *B29B 17/00* (2013.01); *B29B 7/26* (2013.01); *B29B 17/0026* (2013.01); *B29B 17/0047* (2013.01); *B29B 2017/0015* (2013.01); *B29C 45/1769* (2013.01); *B29K 2067/003* (2013.01); *Y02W 30/62* (2015.05)

(58) Field of Classification Search
CPC .......... B29B 7/801; B29B 7/26; B29B 17/00; B29B 17/0005; B29B 17/0026; B29B 17/0042; B29B 17/0047; B29C 45/1769
USPC ........... 425/88, 132, 145, 146, 183, 184, 203, 425/215, 217, 257, 258, 546, 584, 557, 560, 425/562
See application file for complete search history.

(56) References Cited

U.S. PATENT DOCUMENTS

| | | | | |
|---|---|---|---|---|
| 4,019,535 A | * | 4/1977 | Buckethal | 137/625.15 |
| 4,116,601 A | * | 9/1978 | Lehmann et al. | 425/324.1 |
| 4,164,956 A | * | 8/1979 | Takahashi et al. | 137/242 |
| 5,129,588 A | * | 7/1992 | Toshio et al. | 241/33 |
| 5,352,611 A | * | 10/1994 | Fine et al. | 436/43 |
| 5,376,550 A | * | 12/1994 | Fine et al. | 436/47 |
| 5,561,068 A | * | 10/1996 | Rounbehler et al. | 436/139 |
| 5,567,623 A | * | 10/1996 | Rounbehler et al. | 436/158 |

(Continued)

FOREIGN PATENT DOCUMENTS

| | | |
|---|---|---|
| AT | 413965 T | 11/2008 |
| AT | 508655 T | 5/2011 |

(Continued)

OTHER PUBLICATIONS

German search report for 102011005568.1, dated Aug. 26, 2011.

(Continued)

*Primary Examiner* — Seyed Masoud Malekzadeh
(74) *Attorney, Agent, or Firm* — Marshall, Gerstein & Borun LLP

(57) ABSTRACT

A plant and a method for the recycling of plastics, preferably PET, including a switching device for switching between a first process line for a first production process for the production of a first recycling product, in particular pellets, and a second process line for a production process for the production of a second recycling product, in particular flakes, so as to render the recycling process more flexible.

9 Claims, 2 Drawing Sheets

(56) References Cited

U.S. PATENT DOCUMENTS

| | | | |
|---|---|---|---|
| 5,992,335 A * | 11/1999 | Nakamura et al. | 110/342 |
| 6,085,672 A * | 7/2000 | Nakamura et al. | 110/219 |
| 6,230,634 B1 * | 5/2001 | Okochi et al. | 110/342 |
| 6,540,798 B2 * | 4/2003 | Asanuma et al. | 44/628 |
| 6,576,172 B1 * | 6/2003 | Ario et al. | 264/40.3 |
| 6,660,052 B1 * | 12/2003 | Nakamura et al. | 44/629 |
| 6,787,073 B1 * | 9/2004 | Tadler et al. | 264/5 |
| 7,250,451 B2 * | 7/2007 | Tang | 521/41 |
| 8,297,831 B2 * | 10/2012 | Lidgren et al. | 366/268 |
| 2002/0033124 A1 * | 3/2002 | Asanuma et al. | 110/346 |
| 2002/0123553 A1 * | 9/2002 | Sullivan et al. | 524/449 |
| 2005/0203197 A1 * | 9/2005 | Tang | 521/41 |
| 2006/0208375 A1 * | 9/2006 | Fuvesi | 264/37.32 |
| 2006/0250109 A1 * | 11/2006 | Haraguchi et al. | 320/110 |
| 2007/0217282 A1 * | 9/2007 | Lidgren et al. | 366/108 |
| 2010/0008181 A1 * | 1/2010 | Lidgren et al. | 366/139 |
| 2010/0109196 A1 * | 5/2010 | Al-Sabih et al. | 264/294 |
| 2011/0311670 A1 * | 12/2011 | Northcott et al. | 425/143 |
| 2012/0258189 A1 * | 10/2012 | Wilhelm | 425/217 |
| 2013/0064033 A1 * | 3/2013 | Lidgren et al. | 366/77 |
| 2013/0216734 A1 * | 8/2013 | Van Pottelbergh et al. | 428/2 |

FOREIGN PATENT DOCUMENTS

| | | |
|---|---|---|
| CN | 2799211 Y | 7/2006 |
| DE | 19753398 A1 | 6/1999 |
| DE | 10348144 A1 | 5/2005 |
| DE | 102005013701 A1 | 9/2006 |
| GB | 2459650 | 11/2009 |
| JP | H10259272 A | 9/1998 |

OTHER PUBLICATIONS

European Search Report for Application No. 12155079.2 dated Jun. 22, 2012.
Notification of Official Communication for EP 12 155 079.2, dated Apr. 15, 2015.
Notification of First Office Action, Application No. 201210068726. X, Dated Jan. 6, 2014.

* cited by examiner

PLANT AND METHOD FOR THE RECYCLING OF PLASTICS, PREFERABLY PET

CROSS-REFERENCE TO RELATED APPLICATION

The present application claims the benefit of priority of German Application No. 102011005568.1, filed Mar. 15, 2011. The entire text of the priority application is incorporated herein by reference in its entirety.

FIELD OF THE DISCLOSURE

The disclosure relates to a plant and a method for the recycling of plastics, preferably PET.

BACKGROUND

PET is used on a large scale for containers in the food industry, especially for beverage bottles. In consequence, large quantities of spent waste containers are produced, which can no longer be returned to the filling process. Methods and plants for recycling these waste containers and process them to obtain again a PET source material suited for use with food, for the production of new containers are already known. Such a recycling plant may be provided directly upstream of a production line for the production of new PET containers, where the recycled product coming from the recycling plant can directly be introduced, for example, into an injection molding machine for the production of preforms as starting product for new PET bottles.

There are recycling plants for PET, which are each designed for a specific type of recycling product. For example, the recycling plant may be designed for the production of so-called flakes or the production of pellets. In principle, flakes are the products from a grinder, which have been cleaned, sorted and decontaminated for use in foodstuffs. Pellets are products from an extruder, where they were homogenized by thermal influence. Both production methods have advantages and disadvantages. The advantages of the flake process lie, for example, in a small energy input, in the fact that no acetaldehyde is formed, that the intrinsic viscosity is not reduced, that possibly contained foreign plastics cannot coalesce, and that drying is possible at low temperatures. Disadvantages of the flake process are that flakes are less suitable for being admixed to newly produced PET (virgin PET) and that foreign plastics can oxidize. The advantages of the pellet process lie in a simple and unproblematic admixture to virgin material, and in the use of a melt filter filtration technique for removing finest particles. The disadvantages of the pellet process lie in a considerably greater energy input, in the risk that acetaldehyde is formed, and that foreign plastics may coalesce, so that no homogenous PET is obtained.

Due to this fact both processes are in use and are employed, depending on the interests of the manufacturer. However, once a recycling plant is installed the user is committed to this process, at least for the service life of the plant.

SUMMARY OF THE DISCLOSURE

One aspect of the disclosure is obtaining more flexibility for the recycling of PET.

The embodiment according to the disclosure allows the user to switch from one process to the other, according to requirements and preconditions.

Preferably, both processes are not strictly carried out in parallel, but are interconnected with each other, and a changeover from one process line to another process line can be realized by material flow switches. The interconnection is preferably accomplished to allow the use of as many of the present plant components as possible in both process lines. The interconnection may also be realized with bypass transport routes, allowing that specific plant components in the different process lines are started in different orders, with the controller being configured in such a way that shared plant components can be operated subject to different programs and with different parameters, if necessary.

A shared plant component can be, for example, a vacuum reactor, in which a material flow switch can be provided particularly easily, in which, for example, two alternately operable outlet paths are provided.

BRIEF DESCRIPTION OF THE DRAWINGS

An embodiment of the disclosure will be explained in more detail below by means of the drawings.

DETAILED DESCRIPTION OF THE PREFERRED EMBODIMENT

Figure 1:
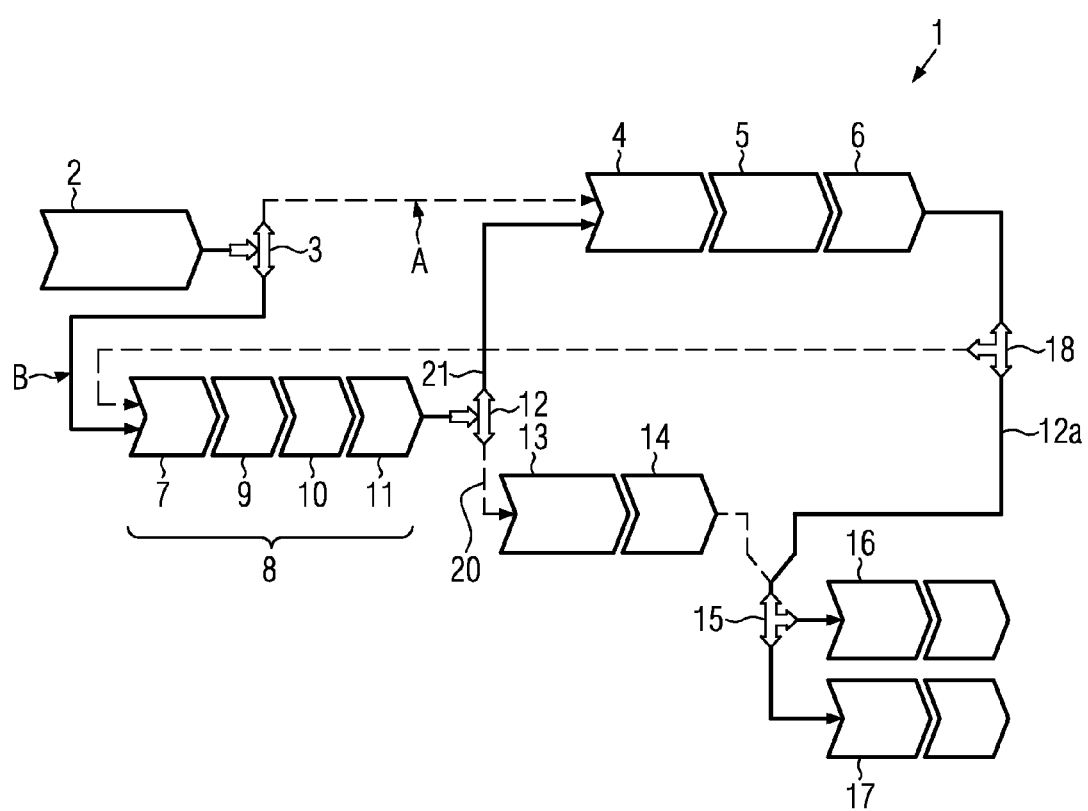
FIG. 1 shows a block diagram of the plant according to the disclosure for carrying out the method according to the disclosure.

FIG. 1 shows a block diagram of a plant 1 according to the disclosure for the recycling of PET, to obtain a recycled product which is suited for the production of containers usable in the food industry. However, the disclosure can also be used for those plants that provide recycled PET for a non-sterile application, or it may be employed for the recycling of other plastics.

Plant 1 according to the disclosure comprises a conventional grinder, not illustrated in FIG. 1, in which PET products are ground to material shred or so-called flakes. A washing plant for removing label residues or dirt is not shown in FIG. 1 either. Plant 1 according to FIG. 1 first comprises, for example, a sifter 2 of the washing device, by means of which visible impurities are removed. At the outlet of the sifter 2 a switching device is located, e.g. in the form of a first material flow switch 3 conducting the material flow into a first process line A, which is shown by a dashed line, and into a second process line B, which is shown by a continuous line. In the exemplary embodiment shown, the first process line A comprises the plant components for the production of a first recycling product, preferably pellets. The plant components of process line A, which are passed through in the order specified below, are a sifter 4 for fines, a sieve 5 for removing the fines, a color sorter 6 for sorting out discolored or false color flakes, and a silo 7 for collecting the cleaned and washed flakes, followed, for example via another material flow switch 18, by a decontamination stage 8. In the exemplary embodiment shown, the decontamination stage 8 is formed of a first heating screw 9, a second heating screw 10 and a vacuum reactor 11. The flakes are heated in the heating screws. Next, residual contents are extracted in the vacuum reactor 11.

The vacuum reactor 11 is associated with a switching device, e.g. in the form of another material switch 12 explained in more detail below, leading into an extruder 13 for the production of pellets. In the extruder 13 the flakes are plasticized by the supply of heat and brought into a shape from which pellets may be formed. These pellets subsequently run through a cooler 14, and are transported by another material flow switch 15 either into packaging containers 16, or as bulk cargo into transport containers 17, or are directly introduced into a further processing machine (not illustrated in FIG. 1), e.g. an injection molding machine for the production of preforms for beverage bottles.

The second process line B comprises the plant components for the production of a second recycling product, preferably flakes, and employs the plurality of the plant components of process line A, however, with some of the plant components being run through in a different order. The non-illustrated grinder and the sifter/washing device 2 are run through in the same order as in process line A. The material flow switch 3 is set in such a way that the flakes leaving the sifter 2 are immediately transported into the silo 7, and from there into the decontamination device 8 comprising the first heating screw 9, the second heating screw 10 and the vacuum reactor 11. The decontamination process is carried out analogously to the pellet production process in process line A. Then, the material flow switch 12 is set to make the flakes run through the sifter 4, the sieve 5, and the color sorter 6 so that flakes that were possibly discolored during the heating can be sorted out. From the color sorter 6 the flakes are transported via a bypass route 12*a*, bypassing extruder 13 and cooler 14, directly to the material switch 15, which distributes the flakes to the containers 16, 17 or to the injection molding machine.

Figure 2:
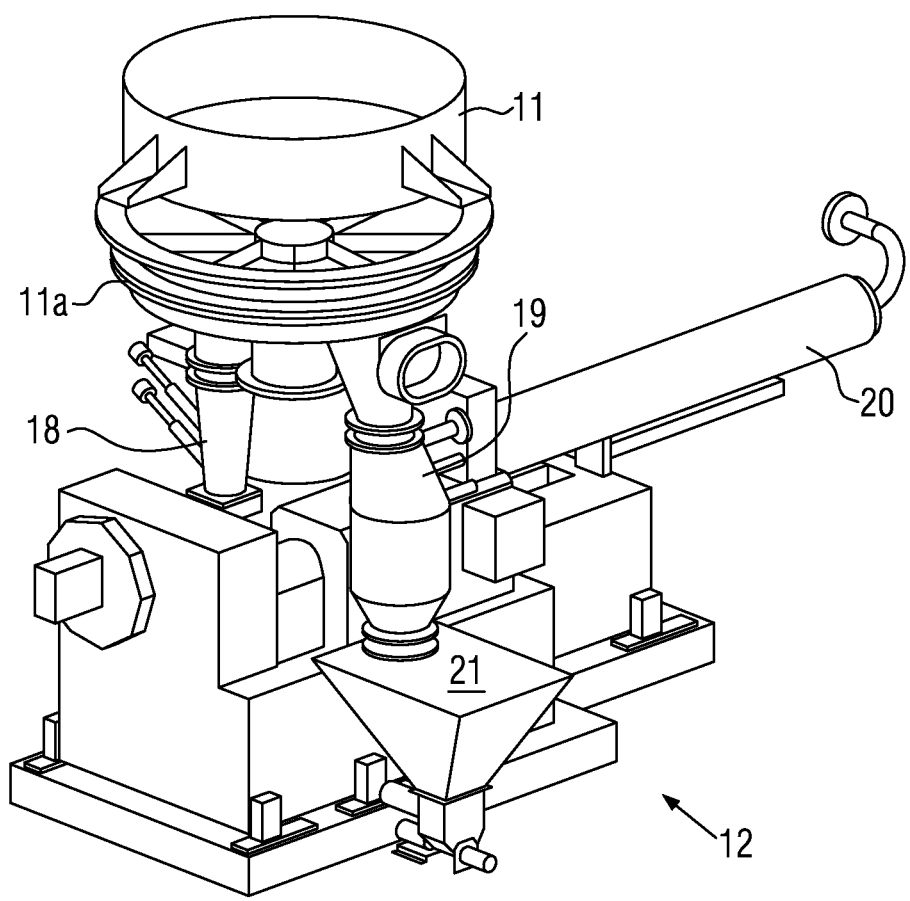
FIG. 2 shows a schematic perspective view of a material flow switch associated with a reactor.

FIG. 2 schematically shows the material switch 12 associated with the vacuum reactor 11. The vacuum container 11 comprises a vacuum bottom 11*a*, which has two outlet openings 18 and 19 spaced away from each other. Both outlets 18, 19 are designed as bulk material feeders and can be locked, for example, by a slide or a blind cover accessible through an access opening. The outlet 18 leads into process line A, i.e. to the extruder 13, for example through a conduit 20. The outlet 19 leads into process line B for flakes, and is connected, e.g. by a chute 21, to the sifter 4 for fines.

The controller of the plant 1 is configured such that the user merely has to preselect a specific process line A or B so as to start the desired process. Where necessary, a manual switching may be required, e.g. at material flow switch 12, for opening and closing special access openings and for inserting and removing blind covers. Moreover, the controller ensures that plant components such as the sifter 4, the sieve 5, the color sorter 6 and the decontamination device 8 are operated in accordance with the production process for the first recycling product (pellets) or the second recycling product (flakes) with different parameters, adapted to the selected process. Such parameters are, for example, the conveying speed in a continuous or discontinuous operation, holding times, temperatures such as drying temperatures or temperatures of conveyor members, parameters of sorters or the like.

The switching operations will be explained in more detail below by means of examples.

Example 1

The plant is operated in the flake process and is to be switched to the pellet process. The following operations take place:

1. The user selects the switching to the pellet process.
2. The vacuum reactor 11 no longer delivers flakes and breaks the vacuum.
3. The sifter/washing device 2 interrupts the transport to the decontamination device 8.
4. After the vacuum in the vacuum reactor 11 was broken (which is signaled to the user), the material flow switch 12 is switched over. To this end, the access opening at the pellet process outlet has to be opened and the blind cover for the material flow has to be removed. After that, process line A is open, and this access opening is closed again. Next, the access opening at the flake process outlet is opened, and the outlet is closed with the blind cover. Thus, product line B is locked. The access opening of the flake process is now closed again.
5. The sifter 4 for fines, the sieve 5 for fines and the color sorter 6 continue to operate until they are empty.
6. The other material switches 3 and 15 are switched over.
7. After the sifter 4, the sieve 5 and the color sorter 6 have been emptied, the parameter sets for the operating state of the first process line A for pellets are automatically loaded into the plant components used for both product lines.
8. The controller is being signaled as soon as all manual alterations are concluded.
9. The sifter/washing device continues the transport to the decontamination module 8.
10. The production process for pellets is now initiated, and the alteration is concluded.

The controller detects which one of the production processes is in operation, and it is capable without any further intervention to automatically switch the relevant parameter set required therefor and change over the switch position for the different product lines.

Example 2

The plant is operated in the pellet production process and is to be switched to the flake production process. The following operations are necessary:

1. The user selects the desired production process (flake process).
2. The vacuum reactor 11 no longer delivers pellets and breaks the vacuum.
3. The sifter/washing device interrupts the transport to the decontamination module 8.
4. After the vacuum in the vacuum reactor 11 was broken (which is signaled to the user), the vacuum bottom 11 is converted. To this end, the access opening at the flake process outlet has to be opened and the blind cover for the material flow has to be removed. After that, product line B is open, and this access opening is closed again. Next, the access opening at the pellet process outlet is opened, and the outlet is closed with the blind cover. Thus, process line A is locked. The access opening of the pellet process is now closed again.
5. The sifter 4 for fines, the sieve 5 for fines and the color sorter 6 continue to operate until they are empty.
6. The material switches 3 and 15 are switched over.
7. After the sifter 4, the sieve 5 and the color sorter 6 have been emptied, the parameter sets for the production process for flakes are automatically loaded into the plant components used for both product lines A and B.
8. The controller is being signaled as soon as all manual alterations are concluded.
9. The sifter/washing device continues the transport to the decontamination module 8.
10. The production process for flakes is now initiated, and the alteration is concluded.

The controller detects the currently used production process, and it is capable without any further intervention to automatically switch the relevant parameter set and change over the switch position for the different product lines A, B.

According to a modification of the exemplary embodiments described and illustrated above, the product lines may, on the one hand, be provided with different plant components according to requirements and, on the other hand, also be designed for the production of other recycling products. Further, the switching can be accomplished fully automatically by the process controller, also in the region of the material switch at the vacuum reactor, with two controllable outlets of the vacuum reactor being optionally provided.

The invention claimed is:

1. A plant for the recycling of plastics, comprising a switching device for switching a flow of plastic material between a first process line (A) for the production of a first recycling product being pellets, and a second process line (B) for the production of a second recycling product being flakes, and wherein the first and the second process lines (A, B) comprise common plant components, being plant components for removing impurities, and plant components for a decontamination by a decontamination device comprising a vacuum reactor wherein the vacuum reactor includes two alternately operable outlet paths, wherein at least one bypass transport route is provided for interconnecting the common plant components in a different order,
wherein the common plant components usable by the first process line (A) and the second process line (B) are started in different orders, wherein in the first process line (A), the plant components for removing impurities are disposed upstream of the plant components for the decontamination, and in the second process line (B), the plant components for removing impurities are disposed downstream of the plant components for the decontamination.

2. The plant according to claim 1, wherein the switching device comprises at least one material flow switch.

3. The plant according to claim 1, wherein a controller for operating the common plant components is provided.

4. The plant according to claim 1, and wherein the vacuum reactor is provided for both the first and second process lines (A, B).

5. The plant according to claim 4, wherein the vacuum reactor comprises a material flow switch in the outlet area thereof.

6. The plant according to claim 1, and wherein the first process line (A) comprises the plant components for removing impurities, the plant components for a decontamination, and an extruder.

7. The plant according to claim 1, and wherein the first and the second process lines (A, B) comprise one common plant component for grinding and one common plant component for washing.

8. The plant according to claim 1, wherein the plastics are PET.

9. The plant according to claim 3, wherein the controller is for one of the production of the first recycling product and the production of the second recycling product.

* * * * *